United States Patent [19]
Nishikawa

[11] 4,330,959
[45] May 25, 1982

[54] DOORBELT MOLDING

[75] Inventor: Masumi Nishikawa, Toyoake, Japan

[73] Assignee: Aisin Seiki Kabushiki Kaisha, Aichi, Japan

[21] Appl. No.: 149,877

[22] Filed: May 14, 1980

[30] Foreign Application Priority Data

May 28, 1979 [JP] Japan .............................. 54-71469[U]

[51] Int. Cl.³ ............................................ E05F 11/38
[52] U.S. Cl. ..................................................... 49/377
[58] Field of Search ............................................ 49/377

[56] References Cited

U.S. PATENT DOCUMENTS

| | | | |
|---|---|---|---|
| 1,534,498 | 4/1925 | Bourgon | 49/377 |
| 1,641,157 | 9/1927 | Cook | 49/377 |
| 2,457,312 | 12/1948 | Kramer | 49/377 X |
| 2,464,406 | 3/1949 | Kramer | 49/377 X |

*Primary Examiner*—Kenneth Downey
*Attorney, Agent, or Firm*—Sughrue, Mion, Zinn, Macpeak and Seas

[57] ABSTRACT

A doorbelt molding used for motor vehicles includes a flanged portion standing close to a window glass and inwardly folded, an extending portion integrally extending from the flanged portion, and an outer weather strip being attached to the extending portion, thereby shortening the distance between the window glass and the outer weather strip as short as possible.

1 Claim, 2 Drawing Figures

DOORBELT MOLDING

BACKGROUND OF THE INVENTION

1. Field of the Invention

This invention relates to a doorbelt molding in general, and more particularly to a doorbelt molding which is used for motor vehicles.

2. Prior Art

As shown in FIG. 1, a conventional doorbelt molding 10 substantially having a U-shape configuration is fixedly attached to a door outer panel 11. Inside of the door of the doorbelt molding 10 an outer weather strip 12 is provided, and an inner weather strip 15 is provided at the end of a reinforcement member 14 which is fixedly mounted on a door trim 13. A window glass 16 is slidably interposed between these both weather strips 12 and 15. The reference numeral 17 shows a door inner panel. The both panels 11 and 17 are provided with reinforcement members 18 and 19 therewithin, respectively.

Considering the interior of the motor vehicle and the shoulder space thereof, or considering the point of the design of the motor vhicle, it is today requested to make two planes of the window glass and the door outer panel identical, that is to say, to shorten the distance between the plane of the window glass and the door outer panel, thereby presenting attractive appearance.

In the above-mentioned conventional doorbelt molding 10, however, the molding 10 is substantially U-shaped configuration, and it is not inwardly folded to make the identification of the two planes of the window glass and the door outer panel.

SUMMARY OF THE INVENTION

It is one general object of the present invention, therefore, to provide a new and improved doorbelt molding.

More specifically, it is an object of the present invention to provide a doorbelt molding which makes two planes of the window glass and the door outer panel identical and which presents attractive appearance.

It is another object of the present invention to provide a doorbelt molding in which the disadvantages of conventional doorbelt moldings are substantially eliminated.

DESCRIPTION OF THE DRAWINGS

Other objects, features and advantages of the present invention will become more apparent upon reference to the succeeding detailed description thereof, and to the drawings illustrating a preferred embodiment thereof; wherein.

DETAILED DESCRIPTION OF THE INVENTION

Figure 1:
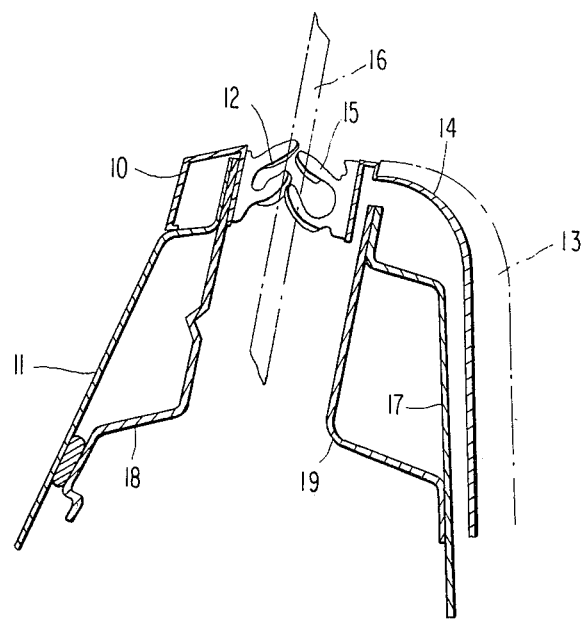
FIG. 1 is a sectional side view of a conventional doorbelt molding which is attached to the door of the motor vehicle.
Figure 2:
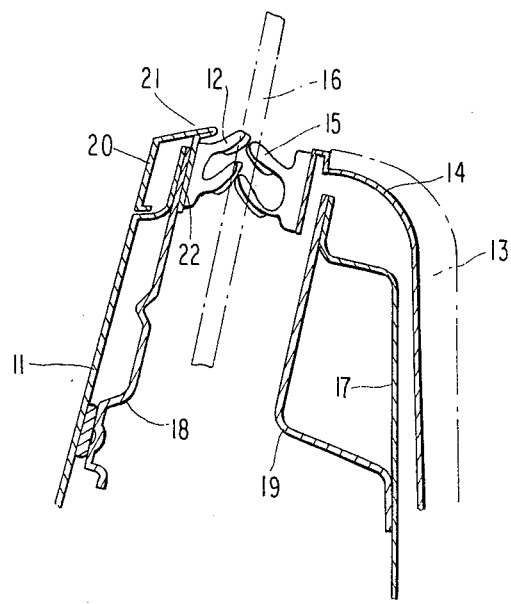
FIG. 2 is a sectional side view of the door belt molding according to the present invention.

In detail, only the composition which differs from the conventional doorbelt molding 10 shown in FIG. 1 will be presented as follows according to FIG. 2. Referring now to FIG. 2, though a doorbelt molding 20 is substantially U-shaped configuration, at the right end of the upper portion of the doorbelt molding 20, namely at the portion standing close to the window glass 16 a flanged portion 21 is provided and is inwardly folded.

The outer weather strip 12 is attached to an extending portion 22 extending from the flange portion 21 of the doorbelt molding 20 into the body. About half of the weather strip 12 is covered up by the flanged portion 21. Accordingly, since the length of the upper portion of the doorbelt molding 20, namely the portion exposed to the outside, is not different from that of the conventional doorbelt molding 10, the appearance is not damaged. Furthermore, since the distance between the window glass 16 and the door outer panel 11 becomes shorter than that of the conventional molding 10, the attractive appearance is obtained.

It is to be understood, however, that even though there is herein shown and described a preferred embodiment of the invention the same is susceptible to certain changes fully comprehended by the spirit of the invention as herein described and the scope of the appended claims.

What is claimed is:

1. A doorbelt molding adapted to extend over and be secured to the outer panel of a door adjacent a window opening comprising an outer portion adapted to be aligned with said door panel, an inwardly extending flange portion adapted to extend over the top of said door panel into close proximity to a window glass, said flanged portion being reversely folded away from said window glass into close proximity with said door panel, a downwardly extending portion integrally connected to said folded flange portion and an outer weatherstrip directly secured to said downwardly extending portion and adapted to engage said window glass wherein about half of said weatherstrip is covered by said folded flange portion.

* * * * *